Dec. 24, 1957  H. H. CHAMBERLAIN  2,817,819
ELECTRIC TRANSLATION APPARATUS
Filed Sept. 30, 1955  2 Sheets-Sheet 1

Inventor:
Harvey H. Chamberlain
by, Richard E. Hosley
His Attorney

Dec. 24, 1957  H. H. CHAMBERLAIN  2,817,819
ELECTRIC TRANSLATION APPARATUS
Filed Sept. 30, 1955   2 Sheets-Sheet 2

Inventor:
Harvey H. Chamberlain
by, Richard E. Horley
His Attorney

United States Patent Office 2,817,819
Patented Dec. 24, 1957

2,817,819

ELECTRIC TRANSLATION APPARATUS

Harvey H. Chamberlain, Marblehead, Mass., assignor to General Electric Company, a corporation of New York Application September 30, 1955, Serial No. 537,698

10 Claims. (Cl. 332—3)

This invention relates to electric translation apparatus, and, more particularly, to apparatus for converting a direct potential to an alternating potential whose frequency varies with the amplitude of the direct potential.

There are numerous applications for electronic apparatus that operates to convert a direct current signal into a frequency varying alternating current signal; for example, in the field of telemetering, where the indication of a measured quantity such as current, voltage, power, pressure or other electrical or non-electrical quantities is made at a remote point, such apparatus finds ready application.

In telemetering, a transducer is generally utilized to provide a direct current signal whose amplitude varies with the magnitude of the quantity being measured. The direct current signal representing the quantity being measured may then be converted into an alternating current signal for transmission to the remote measuring point. Recently, because of congestion present in various other types of commercial channels, increased interest has arisen in the use of microwave equipment for the transmission of telemetering information. In such microwave transmission, the use of a frequency varying alternating current signal possesses numerous inherent advantages.

Accordingly, a primary objective of the present invention is to provide translation apparatus that is especially suited for embodiment in telemetering equipment for converting a direct potential to an alternating potential whose frequency varies with the amplitude of the direct potential.

Another object is to provide such apparatus that possesses both a high degree of stability and high sensitivity.

Another object of the invention is to provide translation apparatus that requires negligible input current and, hence, does not load the output circuit of the transducer or other device to which it is connected.

A further object is to provide such translation apparatus that embodies simple electrical circuitry and comprises conventional, readily available components.

One embodiment of the invention for converting a direct potential input to an alternating potential comprises oscillation producing means having photocell means connected to control the frequency of the oscillations produced. The oscillations are supplied to means for providing a feedback direct potential whose amplitude varies with the frequency of the oscillations.

The input direct potential and feedback direct potential are connected to actuate a galvanometer, which carries a mirror arranged to reflect light on the photocell means as determined by the direct potentials supplied to the galvanometer. If the input direct potential does not equal the feedback direct potential, the galvanometer is actuated to vary the amount of light impinging on the photocell. This, in turn, varies the operating frequency of the oscillation producing means until the two potentials are equal. The alternating potential output, whose frequency varies with the amplitude of the first direct potential, may be taken from the output of the oscillation producing means. A constant reference potential may also be supplied to the galvanometer to provide an alternating potential output from the apparatus when the input direct potential is zero.

For a better understanding of the invention, together with further objects and advantages thereof, reference is made to the following description taken in conjunction with the accompanying drawing, in which.

Figure 1:
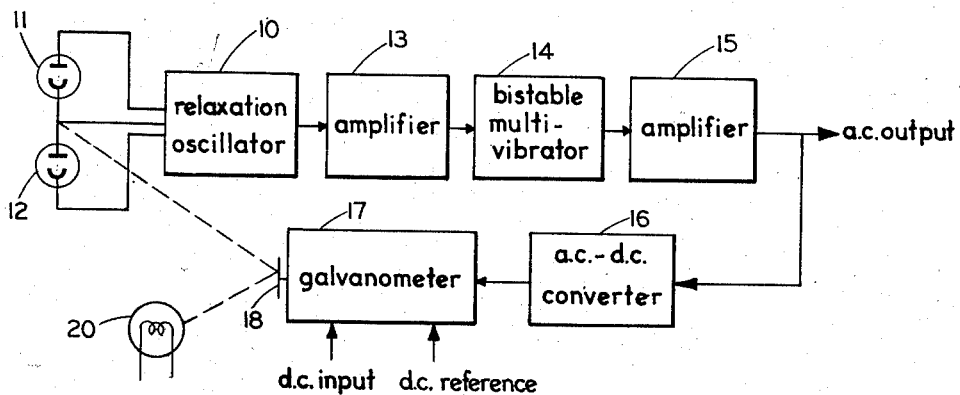
Fig. 1 is a block diagram of one embodiment of the invention.

Referring now to Fig. 1, it is seen that the circuit of the invention includes a conventional relaxation oscillator 10 into which are connected a pair of photocells 11 and 12 of the conventional type whose resistance varies in accordance with the amount of light falling thereon. The photocells 11 and 12 are connected into the relaxation oscillator 10 in a manner to be later described in detail, so that the frequency of oscillations of the oscillator 10 is controlled by the relative amounts of light falling on the photocells.

The oscillations from the relaxation oscillator 10 are supplied to a conventional alternating current amplifier 13 which serves to amplify and differentiate the oscillations to provide a series of relatively sharp pulses. The pulses are supplied from the amplifier 13 to a conventional bistable multivibrator 14.

The multivibrator 14, which is triggered from one stable condition to the other by the input pulses, provides at its output essentially square wave oscillations having a frequency of one half that of the oscillations of the relaxation oscillator 10. The square wave oscillations from the multivibrator 14 are then amplified by a conventional alternating current amplifier 15 and supplied to an A.-C. to D.-C. converter 16. The converter 16 serves to provide a feedback direct potential whose amplitude varies with the frequency of the square wave oscillations supplied thereto. The feedback direct potential from the converter 16 and the input direct potential to the apparatus are supplied in series to the deflection coil of a galvanometer 17. The galvanometer 17 carries a mirror 18 arranged to reflect light from a light source 20 onto the photocells 11 and 12 with the relative amounts of light falling on the photocells depending on the deflection of the galvanometer.

The galvanometer 17 responds to differences between the amplitudes of the two direct potentials supplied thereto. If the input direct potential to the galvanometer is different from the feedback direct potential supplied from the converter 16, the mirror 18 of the galvanometer is caused to rotate to increase the amount of light falling on one of the photocells 11, 12 and decrease the amount of light falling on the other photocell. This causes the frequency of oscillation of the relaxation oscillator 10 to vary until the feedback direct potential from the converter 16 equals the input direct potential to the galvanometer from the transducer or other device to which the translation apparatus is connected. Thus, the alternating potential provided by the amplifier 15, which is the output signal of the apparatus of the invention, varies in frequency with the input direct potential to the galvanometer 17. A reference direct potential may also be supplied to the galvanometer 17 in order to provide an alternating potential output signal when the input direct potential is zero.

Figure 2:
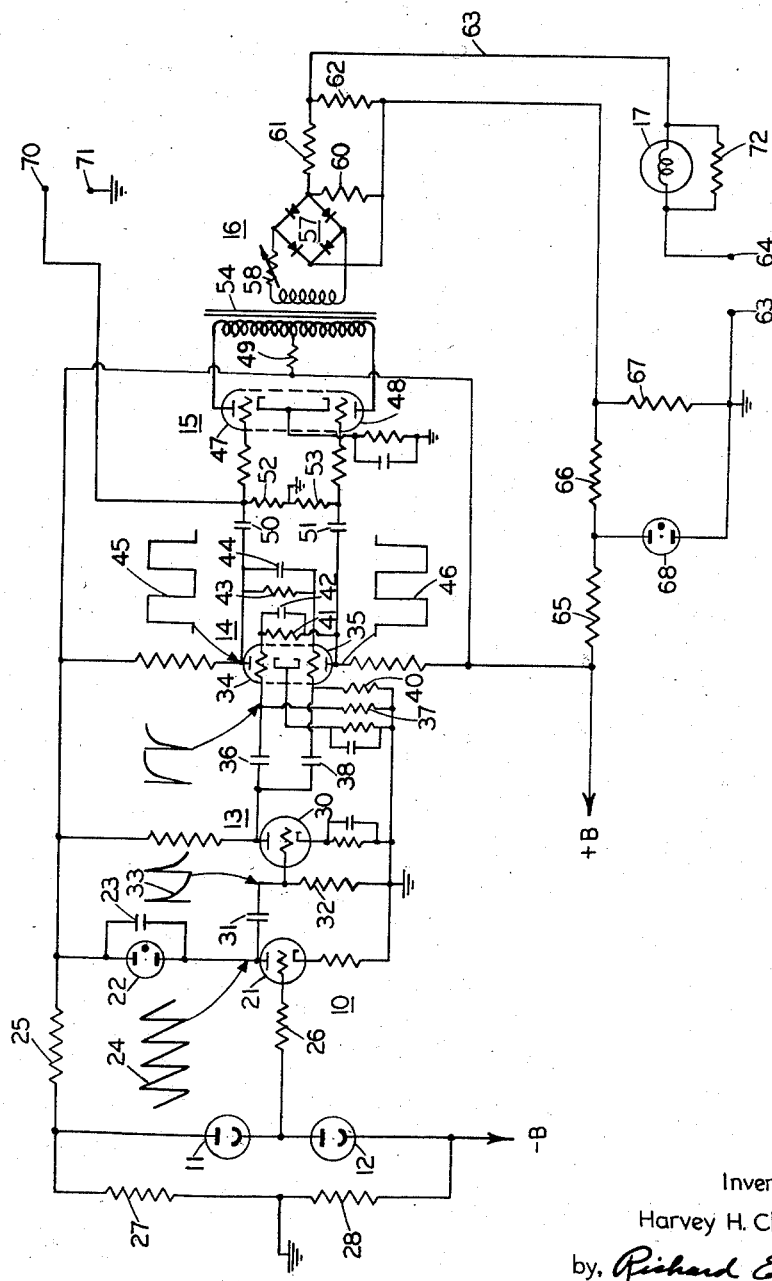
Fig. 2 is a schematic circuit diagram corresponding to the block diagram of Fig. 1.

Reference is now made to Fig. 2 for the details of an apparatus that embodies the teachings of the invention. The relaxation oscillator 10 is seen to be of conventional type comprising an electron discharge device 21 having a glow discharge device 22 and a capacitor 23 connected in parallel in its anode circuit. The anode of the discharge device 21 is connected through the discharge device 22 and capacitor 23 to a positive potential (+B) provided from a conventional power supply (not shown) that may also provide power for heating the filaments of the various electron discharge devices in the apparatus.

As the discharge device 21 conducts current from its anode to cathode, the capacitor 23 charges toward the value of the +B potential. When the potential drop across the capacitor 23 reaches the break down potential of the glow discharge device 22, the capacitor 23 quickly discharges through the negligible resistance of the discharge device 22 until the potential drop across the capacitor is insufficient to maintain conduction through the glow discharge device. At that time the capacitor 23 again starts to charge and the cycle is repeated. Thus, the potential at the anode of the discharge device 21 falls slowly as the capacitor charges and rises quickly as the capacitor discharges to provide a saw-tooth potential waveform of the type shown in curve 24.

The rate at which the capacitor 23 charges and, hence, the slope of the falling portion of the potential curve 24 are controlled by the potential on the control grid of the discharge device 21. That potential, in turn, is controlled by the relative resistances of the photocells 11 and 12 which are connected in series with a resistor 25 between the +B potential and a negative potential (−B) that may be provided from the same power supply (not shown) as the +B potential. The control grid of discharge device 21 is connected to the juncture of the photocells 11, 12 through a current limiting resistor 26. A pair of series-connected resistors 27 and 28 are connected across the photocells 11 and 12, with the juncture of the resistors 27 and 28 grounded. The resistors 25, 27 and 28 serve as a voltage divider to provide the proper operating potentials across the photocells 11 and 12.

As previously stated in connection with Fig. 1, the relative resistances of the photocells 11 and 12 are determined by the light reflected thereon from a galvanometer mirror (not shown in Fig. 2). If the position of the galvanometer mirror is such that more light falls on photocell 11 than on photocell 12, the resistance of photocell 11 decreases, the resistance of photocell 12 increases, and the potential on the control grid of discharge device 21 increases. This increases the flow of current through the discharge device 21, which permits the capacitor 23 to charge at a faster rate and increases the frequency of the oscillations of the relaxation oscillator 10. Conversely, if more light falls on photocell 12 than on photocell 11, the potential on the control grid of discharge device 21 decreases and the frequency of oscillations of the oscillator 10 decreases. Although a single photocell might be employed, the use of two photocells greatly improves the sensitivity of the apparatus because the resistance of one photocell increases while the resistance of the other photocell decreases in response to movement of the galvanometer mirror.

The oscillations of the relaxation oscillator 10 are supplied to a conventional alternating current amplifier 13. The anode of discharge device 21 is connected to the control grid of an electron discharge device 30 in the amplifier 13 through a capacitor 31. The control grid of the discharge device 30 is provided with a grid resistor 32 of such value that it, in combination with the capacitor 31, provides a short time constant input circuit for the discharge device 30. Thus, the capacitor 31 and resistor 32 operate to differentiate the saw-tooth wave oscillations from the oscillator 10 to provide across resistor 32 relatively sharp pulses of the general shape shown by the curve 33.

The pulses appearing across resistor 32 are amplified and inverted by the amplifier 13 and supplied to the control grids of a pair of electron discharge devices 34 and 35 connected as a conventional bistable multivibrator 14. The pulses from the anode of the discharge device 30 are applied to the control grid of the discharge device 34 through a short time constant differentiating circuit comprising a capacitor 36 and a resistor 37 and are applied to the control grid of discharge device 35 through a similar circuit comprising a capacitor 38 and a resistor 40, which further sharpen the pulses. The control grid of discharge device 34 is connected to the anode of discharge device 35 through a resistor 41 and capacitor 42 connected in parallel and the control grid of discharge device 35 is similarly connected to the anode of discharge device 34 through a resistor 43 and a capacitor 44.

As is well known, a bistable multivibrator remains in one condition with one of its discharge devices conducting and the other non-conducting until an input pulse causes it to switch to its other condition wherein the first discharge device becomes non-conducting and the other becomes conducting. In the present case, assuming that discharge device 34 is conducting and discharge device 35 is non-conducting, a negative input pulse from the amplifier 13 will drive the control grid of discharge device 34 downwardly causing the discharge device 34 to become non-conducting and its anode potential to rise. The rise in potential of the anode of discharge device 34 is coupled through resistor 43 and capacitor 44 to the control grid of discharge device 35, thus causing discharge device 35 to conduct. The multivibrator will remain in that condition until it receives the next input pulse from amplifier 13, at which time the control grid of discharge device 35 is driven downwardly to cause discharge device 35 to become non-conductive. The rise in anode potential of discharge device 35 when it stops conducting is coupled to the control grid of discharge device 34 through resistor 41 and capacitor 42 to cause discharge device 34 to conduct. Thus, substantially square wave oscillations as shown by the curve 45 are present at the anode of the discharge device 34, while oscillations of similar shape but opposite phase as shown by curve 46 are present at the anode of the discharge device 35. Of course, the frequency of the square wave oscillations is one half that of the frequency of the oscillations of the relaxation oscillator 10 and the input pulses to the multivibrator 17.

The square wave oscillations appearing on the anodes of the discharge devices 34 and 35 are supplied to a conventional push-pull amplifier 15, which comprises a pair of electron discharge devices 47 and 48. The square wave oscillations from the anodes of discharge devices 34 and 35 are supplied through capacitors 50 and 51, respectively, to the control grids of the discharge devices 47 and 48, respectively, and appear across grid resistors 52 and 53, respectively. The anodes of the discharge devices 47 and 48 are connected to opposite ends of the center tapped primary winding of a transformer 54, with the center tap being connected through a load resistor 49 to the +B supply. The amplifier 15 operates in conventional push-pull fashion as is well known in the art.

Figure 3:
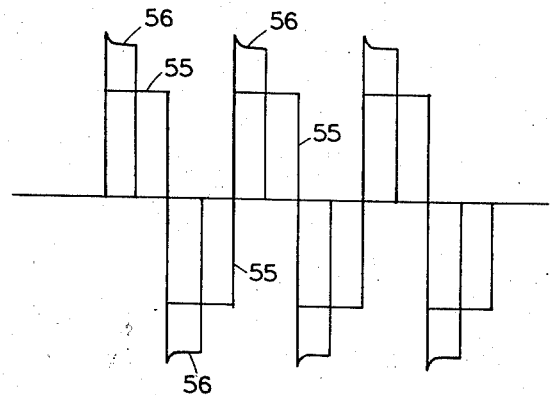
Fig. 3 is a graph showing wave forms useful in understanding the operation of the apparatus of the invention.

The transformer 54, which is part of the A.-C. to D.-C. converter 16, is of the well known type having a saturable core. In the present case, the transformer 54 is so chosen that its core saturates during each half cycle of the highest frequency square wave oscillation that will be impressed across the primary winding of the transformer from the amplifier 15. Fig. 3 illustrates the wave forms of the currents through the primary and secondary windings of the transformer 54. It is seen that if the current through the primary winding is of substantially square wave shape, as shown by the curve 55, the current through the transformer secondary winding has the form of a series of alternately positive and negative substantially rectangular pulses 56. Saturable core transformers are well known in the art and a detailed explanation of their construction and theory of operation is deemed unnecessary. It is sufficient to note that the amplitude of the secondary winding pulses 56 is determined by the slope of the magnetization curve of the transformer core and the width of the pulses is determined by the physical characteristics of the transformer. If the square wave input to the transformer primary winding has a period long enough to permit the core of the transformer to saturate during each half cycle of the square wave, both the amplitude and the width of the pulses across the transformer secondary winding are constant. Of course, the frequency of the pulses appearing across the transformer secondary winding varies with the frequency of the square wave impressed across the transformer primary winding. Therefore, if either the positive or negative output pulses from the transformer 54 can be eliminated, as by rectification, the average direct potential across the secondary winding of the transformer will vary with the frequency of the square wave input to the transformer. In the present case, the positive and negative output pulses from the transformer are rectified by a rectifier bridge 57 connected in series with a variable resistor 58 across the secondary winding of transformer 54.

The rectifier bridge 57 is conventional in all respects and serves to provide across a resistor 60 a pulsating direct potential whose average value varies with the frequency of the square wave current oscillations through the primary winding of the transformer 52. The variable resistor 58 connected in series with the bridge 57 and the secondary winding of transformer 54 serves as a dropping resistor to permit adjustment of the voltage drop across the resistor 60.

A pair of resistors 61 and 62 are connected in series across the resistor 60 to form a voltage divider to provide a feedback direct potential across the resistor 62 for utilization in a manner to be hereafter described.

As was previously mentioned in connection with Fig. 1, the feedback direct potential, the input direct potential and the reference direct potential are supplied to the galvanometer 17. As seen in Fig. 2, the input direct potential, which is to be converted into an alternating potential of variable frequency, may be supplied between a pair of input terminals 63 and 64, with the terminal 63 grounded and the terminal 64 connected to one end of the deflection coil of the galvanometer 17. In the present case, the polarity of the input potential is such that terminal 64 is negative.

The reference direct potential is obtained from a voltage divider comprising resistors 65, 66 and 67 connected in series between the +B supply and ground. A voltage regulator tube 68 such as a glow discharge tube is connected across resistors 66 and 67 to maintain constant the voltage drop across those resistors. The juncture of the resistors 66 and 67 is connected to the positive potential end of resistor 62 across which the feedback potential is developed, and the other end of resistor 62 is connected to the end of the deflection coil of the galvanometer 17 remote from the terminal 64.

It is now apparent that the input direct potential supplied between terminals 63, 64 and the constant reference direct potential developed across resistor 67 are supplied in series to the galvanometer deflection coil to cause current to flow through the coil in one direction. The potential developed across the resistor 62 is supplied to the deflection coil with a polarity to oppose the current flow caused by the other two potentials. Of course, the polarities of the direct potentials may be reversed if it is desired to reverse the direction of the frequency variation of the output alternating potential, as will become apparent to one skilled in the art.

If the input direct potential supplied between terminals 63 and 64 is zero but the potentials developed across resistors 62 and 77 are unequal, current will flow through the deflection coil of galvanometer 17. As was previously explained, this causes the mirror 18 (Fig. 1) carried by the galvanometer to rotate and vary the relative intensities of the light falling on the photocells 11 and 12 until the frequency of oscillation of the relaxation oscillator 10 is such that the direct potential appearing across resistor 62 in the A.-C. to D.-C. converter 16 equals the reference potential appearing across the resistor 67. Similarly, an input direct potential supplied between the terminals 63 and 64 causes deflection of the galvanometer to change the frequency of the relaxation oscillator 10 until the potential appearing across resistor 62 is equal to the sum of the potentials appearing across resistor 67 and between input terminals 63 and 64. Thus the frequency of oscillation of the relaxation oscillator 10 and, hence, the frequency of the oscillations at the output of the multivibrator 14 vary with the amplitude of the input direct potential supplied to terminals 63 and 64.

The alternating potential output from the apparatus may conveniently be taken from the multivibrator 14. In the present case, the output appears between a pair of output terminals 70 and 71. The terminal 70 is connected to the juncture of capacitor 50 and resistor 52 between the multivibrator 14 and the amplifier 15, and the terminal 71 is grounded. Thus substantially square wave oscillations of variable frequency (one half the frequency of the relaxation oscillator 10) appear between the output terminals 70 and 71.

The principal purpose of the reference voltage developed across resistor 67 is to provide an output from the apparatus when there is no input direct potential. In other words, even though there is no input signal, the relaxation oscillator 10 may be made to operate at a desired frequency. In one application of the apparatus in telemetering, it has been found convenient to provide a reference direct potential such that the relaxation oscillator 10 oscillates at a frequency of 12 cycles per second with zero direct potential input and at a frequency of 54 cycles per second with a maximum input potential of 10 millivolts. Of course, the reference potential and the circuit constants might be adjusted for other input potential ranges and to cause the oscillator 10 to operate over other frequency ranges. The frequency may either increase or decrease, as desired, in response to a direct potential input depending on the polarities of the potentials supplied to the deflection coil of the galvanometer 17.

One of the outstanding features of the present invention is the use of a galvanometer and photocells to control the frequency of the relaxation oscillator 10. The galvanometer 17 is preferably of the compensated type in which the return spring torque is reduced to a very low value by magnetic compensation in the manner well known in the art. Such compensation definitely improves the accuracy of the apparatus and contributes to a high degree of sensitivity. In addition, a damping resistor 72 may be connected across the galvanometer coil if desired.

The use of a galvanometer photocell arrangement provides good stability for the apparatus as well as high sensitivity. A galvanometer is inherently insensitive to high frequency variations in its deflection current and serves to average the pulsating direct potential supplied thereto from the output of the rectifier bridge 57, thus keeping the circuitry of the apparatus as simple as possible. When the apparatus is at or near its balance point, which in operation is the usual condition, negligible direct current flows from the input terminals 63, 64 through the galvantometer deflection coil, and so the apparatus does not load the device from which the direct potential input is obtained. In addition, all components of the apparatus are conventional and readily obtainable.

Although a particular embodiment of the invention has been illustrated and described, it is appreciated that many modifications both in circuitry and instrumentation employed therein may be made by one skilled in the art. Therefore, it is intended by the appended claims to cover all such modifications as fall within the scope and true spirit of the invention.

What I claim as new and desire to secure by Letters Patent of the United States is:

1. Apparatus for converting an input direct potential to an alternating potential comprising means for producing oscillations, photocell means connected in circuit with said oscillation producing means to control the frequency of oscillation thereof, means connected to receive said oscillations for providing a feedback direct potential whose amplitude varies with the frequency of said oscillations, and a galvanometer responsive to said input and feedback direct potentials, said galvanometer having a mirror adapted to reflect on said photocell means varying amounts of light as said galvanometer deflects.

2. Apparatus for converting an input direct potential to an alternating potential comprising means for producing oscillations, photocell means connected in circuit with said oscillation producing means to control the frequency of oscillation thereof, means connected to receive said oscillations for providing a feedback direct potential whose amplitude varies with the frequency of said oscillations, a source of reference direct potential, and a galvanometer responsive to said input, feedback and reference direct potentials, said galvanometer having a mirror adapted to reflect on said photocell means varying amounts of light as said galvanometer deflects.

3. Apparatus for converting an input direct potential to an alternating potential comprising means for producing oscillations, photocell means connected in circuit with said oscillation producing means to control the frequency of oscillation thereof, means connected to receive said oscillations for providing a feedback direct potential whose amplitude varies with the frequency of said oscillations, a source of reference direct potential, and a galvanometer connected to receive said input and reference direct potentials with one polarity and said feedback direct potential with opposite polarity, said galvanometer having a mirror arranged to reflect on said photocell means from a light source varying amounts of light as said galvanometer deflects.

4. Apparatus for converting an input direct potential to an alternating potential comprising means for producing oscillations, a pair of photocells connected in circuit with said oscillation producing means to control the frequency of oscillation thereof, means connected to receive said oscillations for providing a feedback direct potential whose amplitude varies with the frequency of said oscillations, a source of reference direct potential, and a galvanometer responsive to said input, feedback and reference direct potentials, said galvanometer having a mirror arranged to reflect on said photocells relatively varying amounts of light as said galvanometer deflects.

5. Apparatus for converting an input direct potential to an alternating potential comprising means for producing oscillations, a pair of photocells connected in circuit with said oscillation producing means to control the frequency of oscillation thereof, means connected to receive said oscillations for providing a feedback direct potential whose amplitude varies with the frequency of said oscillations, a source of reference direct potential, and a galvanometer connected to receive said input and reference direct potentials with one polarity and said feedback direct potential with opposite polarity, said galvanometer having a mirror arranged to reflect on said photocells from a light source relatively varying amounts of light as said galvanometer deflects.

6. Apparatus for converting an input direct potential to an alternating potential comprising means for producing pulses, photocell means connected in circuit with said pulse producing means to control the frequency of said pulses, means responsive to said pulses for producing substantially square wave oscillations, means connected to receive said square wave oscillations for providing a feedback direct potential whose amplitude varies with the frequency of said square wave oscillations, a source of reference direct potential, and a galvanometer connected to receive said input, feedback and reference direct potentials, said galvanometer having a mirror arranged to reflect on said photocell means varying amounts of light as said galvanometer deflects.

7. Apparatus for converting an input direct potential to an alternating potential comprising means for producing substantially square wave oscillations, photocell means connected in circuit with said oscillation producing means to control the frequency of oscillation thereof, means responsive to said square wave oscillations for producing pulses of substantially constant amplitude and width, means connected to receive said pulses for providing a feedback direct potential whose amplitude varies with the frequency of said pulses, a source of reference direct potential, and a galvanometer connected to receive said input, feedback and reference direct potentials, said galvanometer having a mirror arranged to reflect on said photocell means varying amounts of light as said galvanometer deflects.

8. Apparatus for converting an input direct potential to an alternating potential comprising means for producing substantially square wave oscillations, photocell means connected in circuit with said oscillation producing means to control the frequency of oscillation thereof, a saturable core transformer connected to receive said square wave oscillations for producing alternately positive and negative pulses of substantially constant amplitude and width, rectifier means connected to receive said pulses for providing a feedback direct potential whose amplitude varies with the frequency of said pulses, a source of reference direct potential, and a galvanometer connected to receive said input, feedback and reference direct potentials, said galvanometer having a mirror arranged to reflect on said photocell means varying amounts of light as said galvanometer deflects.

9. Apparatus for converting an input direct potential to an alternating potential comprising means for producing relatively sharp pulses, photocell means connected in circuit with said relatively sharp pulse producing means to control the frequency of said pulses, a multivibrator responsive to said relatively sharp pulses for producing substantially square wave oscillations, a saturable core transformer connected to receive said substantially square wave oscillations for providing alternately positive and negative pulses of substantially constant amplitude and width, rectifier means connected to receive said last-mentioned pulses for providing a feedback direct potential whose amplitude varies with the frequency of said last-mentioned pulses, a source of reference direct potential, and a galvanometer connected to receive said input, feedback and reference direct potentials, said galvanometer having a mirror arranged to reflect on said photocell means varying amounts of light as said galvanometer deflects.

10. Apparatus for converting an input direct potential to an alternating potential comprising means including a relaxation oscillator for producing relatively sharp pulses, a pair of photocells connected in circuit with said relaxation oscillator to control the frequency of said relatively sharp pulses, a multivibrator connected to receive said relatively sharp pulses for producing substantially square wave oscillations, a saturable core transformer connected to receive said substantially square wave oscillations for providing alternately positive and negative pulses of substantially constant amplitude and width, rectifier means connected to receive said last-mentioned pulses for providing a feedback direct potential whose amplitude varies with the frequency of said last-mentioned pulses, a source of reference direct potential, and a galvanometer connected to receive said input and reference direct potentials with one polarity and said feedback direct potential with opposite polarity, said galvanometer having a mirror arranged to reflect on said photocells relatively varying amounts of light as said galvanometer deflects.

References Cited in the file of this patent

UNITED STATES PATENTS

| | | |
|---|---|---|
| 1,934,726 | McCreary | Nov. 14, 1933 |
| 2,358,103 | Ryder | Sept. 12, 1944 |
| 2,506,384 | Rich | May 2, 1950 |